UNITED STATES PATENT OFFICE.

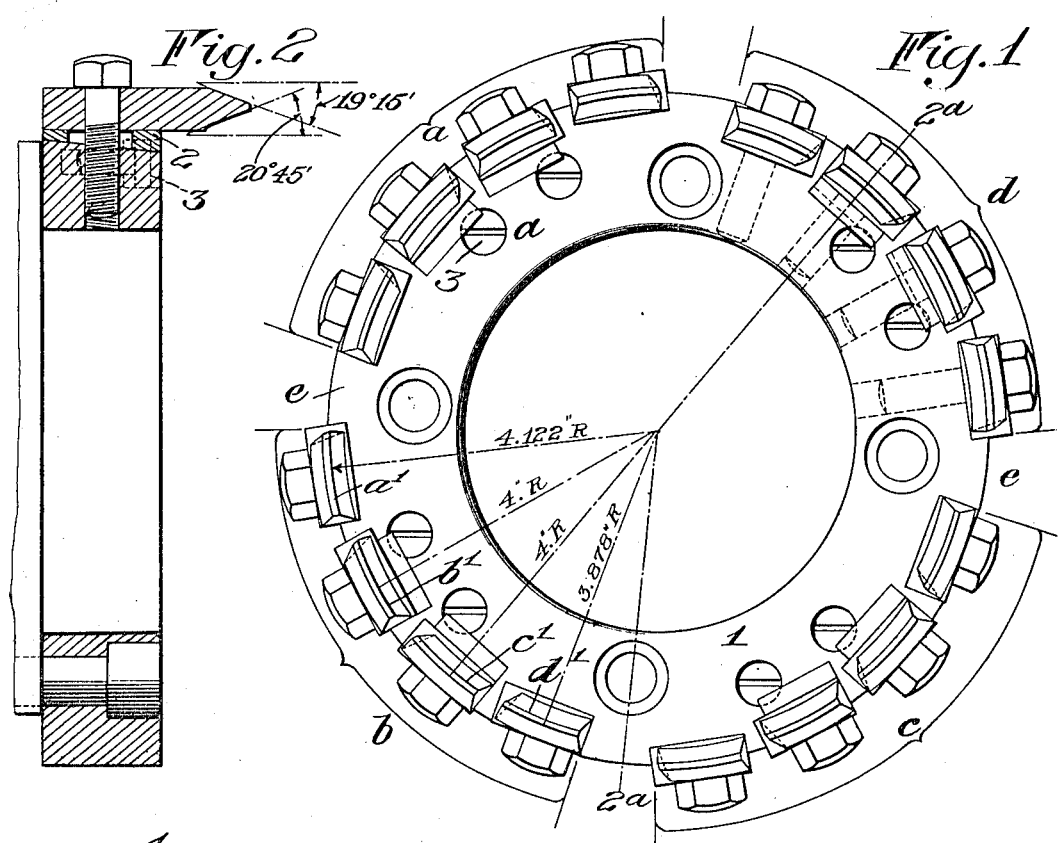

ARTHUR L. STEWART AND BENJAMIN H. BICKLE, OF ROCHESTER, NEW YORK, ASSIGNORS TO GLEASON WORKS, OF ROCHESTER, NEW YORK, A CORPORATION OF NEW YORK.

GEAR-CUTTER.

1,274,466.　　　　Specification of Letters Patent.　　Patented Aug. 6, 1918.

Application filed March 12, 1917.　Serial No. 154,185.

*To all whom it may concern:*

Be it known that we, ARTHUR L. STEWART and BENJAMIN H. BICKLE, both of Rochester, in the county of Monroe and State of New York, have invented certain new and useful Improvements in Gear-Cutters; and we do hereby declare the following to be a full, clear, and exact description of the same, reference being had to the accompanying drawings, forming a part of this specification, and to the reference-numerals marked thereon.

The invention has for its purpose to provide a novel form of cutter to be used in the construction of curved tooth bevel gears, according to the general method disclosed in the application filed by James E. Gleason and Arthur L. Stewart, December 26, 1914, Serial No. 879,026, which involves the use of a rotary face cutter which successively engages different teeth on a blank, while the latter is continuously turned for indexing from one tooth to the next, and at the same time a relative profile generating or rolling motion between the cutter and the blank is effected for properly shaping the side faces of the teeth. The particular purpose of the present improvement is to afford a cutter that will effect both stocking out or roughing and finishing operations and also cut both sides of the teeth, by engaging the teeth on opposite sides of a tooth space during each rotation, and further to make a simple construction, which is practical and can be manufactured on a commercial scale. To these and other ends the invention consists in certain improvements and combinations of parts, all as will be hereinafter more fully described, the novel features being pointed out in the claims at the end of the specification.

In the drawings:

Figure 1 is a plan view of a cutter constructed in accordance with the invention;

Fig. 2 is a sectional view on the line 2ª—2ª of Fig. 1;

Fig. 3 is a plan view of a portion of a gear blank and showing diagrammatically the path of travel of the tools, a diagrammatic section of the gear teeth forming a part of said figure;

Fig. 4 is a perspective view of one of the tools, and

Fig. 5 is a side elevation thereof.

Similar reference numerals in the several figures indicate the same parts.

The machine to which the present type of cutter is to be applied embodies what is in the nature of a hobbing process, since the cutter and blank are both rotating continuously, and different tools on the cutter move progressively from one tooth of the blank to another as the latter is rotated. With the cutter of the application previously referred to, it becomes necessary to stock out or rough the work on one machine and to finish-cut on another, or else employ separate cutters on the same machine, inasmuch as the roughing operation consists in removing the metal between the teeth, while the finishing operation takes a finer cut and shapes the side faces of the teeth. With the structure of the present application, it is possible to maintain the same hobbing relation between the cutter and the blank, and also both rough and finish the teeth by means of independent tools which are set with reference to the cutter head so as to take stocking out and finishing cuts successively. This is preferably accomplished by employing a multiplicity of gangs or series of tools, each gang being adapted for moving through one tooth space. The gangs of tools are so spaced with relation to each other that after the last tool of a gang has passed out of a tooth space, and before the first tool of the next gang has reached the blank, the latter will have traveled far enough in its indexing motion to bring the initial tool of the next gang into engagement with the next tooth space.

In the present embodiment which is shown for illustrative purposes and not intended in any manner as limiting the invention, 1 designates the head or support which is adapted to be rotatively mounted on a gear generator. The head 1 is provided with a multiplicity or series of gangs of tools designated generally by $a$, $b$, $c$ and $d$, respectively, and while four such gangs of tools are shown, there may be employed a greater or less number according to the exigencies of the case. The gangs of tools $a$, $b$, $c$ and $d$ are spaced from each other a sufficient distance as indicated by $e$ to permit the blank to rotate far enough after the last tool of one gang has passed out of a tooth space, to bring the next tooth space into position to be engaged by the initial tool of the next gang.

Each gang of tools comprises preferably four tools indicated by $a'$, $b'$, $c'$ and $d'$, two of which are roughing or stocking out tools while the other two are finishing tools. The first two tools of that gang, $a'$ and $b'$, rough and finish one side of a tooth, that is to say, operate on one side of a tooth space, while the remaining two tools $c'$ and $d'$ finish and rough, respectively, on the opposite side of the tooth space, or the adjacent side of the adjacent tooth to that operated upon by the initial tools $a'$ and $b'$. It will be observed that the last tool $d'$ performs a roughing operation and this prepares a surface for the finishing operation by the tool $c'$ of the gang that next cuts in this same tooth space. In other words, as each gang of tools travels through a tooth space, one side thereof is initially roughed and thereafter finished, whereas the other side has the finishing operation performed first, the surface having been roughed by the last tool $d'$ of a preceding gang of tools. This will be clear from an inspection of Fig. 3 where $x$ designates a tooth space through which the gang of tools illustrated is about to pass. The tool $a'$ roughs the side $x'$ and tool $b'$ finishes the side $x'$ while tool $c'$ finishes the side $x^2$ which has been previously roughed by the tool $d'$ of a preceding gang. The tool $d'$ shown in Fig. 3 roughs the side $x^2$, preparing it for the finishing operation of tool $c'$ of the gang which next passes through the tooth space $x$. The next gang of tools $c$ passes through the tooth space $y$ performing a similar operation, and the cutter continues operating on the blank, the latter rotating continuously and presenting different teeth until the teeth have been completely formed. The number and arrangement of roughing and finishing tools in each gang may be varied although the arrangement shown has been found to be an efficient one.

Adjusting means are provided for the finishing tools $b'$ and $c'$ to permit of setting them on exactly the same radius from the axis of rotation, while the roughing tools are fixedly attached to the cutter head with no provision for adjustment, since such a refinement is not required for stocking. The adjustment for the finishing tools comprises a wedge 2 and screw 3, although other devices may be employed for accomplishing this purpose. The finishing tools $b'$ and $c'$, which cut on opposite sides of the teeth, are preferably arranged at the same radial distance from the center of the head so that the same curve will be produced on both sides of the teeth, and the roughing cutters are arranged nearer to and farther from the center of the head with reference to their finishing cutters according to whether they are cutting on the far side or near side of the teeth. All the cutters are arranged circularly or concentrically with respect to the rotary axis of the head, that is to say, they are formed on arcs of circles about the center of the head, and clearance with the sides of the teeth is afforded by adopting sufficiently large pressure angles. In the present arrangement, the finishing cutters are provided with pressure angles of 19° 15' and 20° 45', which have been found to give a satisfactory relation, although other angles may be computed for different sized cutters and different sizes of gears and gear teeth that will permit the tools to be formed circularly with respect to the center of their supporting head and at the same time clear the teeth in the cutting operation. The bottom of each tool, that is to say, the edge which engages the bottom of the tooth space, designated by 4, is also relieved as shown in Fig. 5 at a sufficient angle to afford proper clearance, such angle being approximately 20° with reference to the plane in which the bottom of the cutting edge travels, for the pressure angle combination already set forth.

We claim as our invention:

1. A gear cutter comprising a rotatable head or support having a plurality of roughing tools arranged thereon adapted to engage opposite sides of teeth, and a plurality of finishing tools adapted to subsequently engage the corresponding sides of the teeth.

2. A gear cutter comprising a rotatable head or support having a plurality of roughing tools arranged thereon adapted to engage opposite sides of teeth, and a plurality of finishing tools adapted to subsequently engage the corresponding sides of the teeth, the cutting edge of the finishing tools being at equal distances from the center of the head and the cutting edges of the roughing tools being at greater and less distances from the center of the head than the finishing tools.

3. A gear cutter comprising a rotatable head or support having a plurality of finishing tools adapted to engage opposite sides of teeth and arranged concentrically of the head with their cutting edges at equal distances from the center.

4. A gear cutter comprising a rotatable head or support having a series of gangs of tools, each gang being adapted to engage a separate slot or tooth space and including both a roughing and finishing tool.

5. A gear cutter comprising a rotatable head or support having a series of gangs of tools, each gang being adapted to engage a separate slot or tooth space and including a plurality of roughing and finishing tools.

6. A gear cutter comprising a rotatable head or support having a series of gangs of tools, each gang being adapted to engage a separate slot or tooth space and including four tools arranged for roughing, finishing, finishing and roughing successively.

7. A gear cutter comprising a rotatable head or support having a series of gangs of tools, each gang being adapted to engage a separate slot or tooth space and including a plurality of roughing and finishing tools, the finishing tools of the different gangs being arranged at the same distances from the center of the head.

8. A gear cutter comprising a rotatable head or support having a series of gangs of tools, each gang being adapted to engage a separate slot or tooth space and including a plurality of roughing and finishing tools adapted to act on both sides of the teeth.

9. A gear cutter comprising a rotatable head or support having a series of gangs of tools, each gang being adapted to engage a separate slot or tooth space and including a plurality of roughing and finishing tools acting on both sides of the teeth, the finishing tools of the different gangs being arranged at the same distances from the center of the head.

10. A gear cutter comprising a rotatable head or support having a plurality of roughing tools extending axially of the tool head and provided with cutting edges at different distances from the center and their clearance on opposite sides, and a plurality of axially extending finishing tools having the points of their cutting edges at substantially the same distance from the center and their clearance on opposite sides.

11. A gear cutter comprising a rotatable head or support having a plurality of similar gangs of axially extending cutting tools thereon, each embodying a pair of roughing and a pair of finishing tools, the corresponding tools of each pair having clearance at the outer and inner sides respectively.

ARTHUR L. STEWART.
BENJAMIN H. BICKLE.